Jan. 9, 1940. W. F. BORKENSTEIN 2,186,601
ELECTRIC OUTLET FIXTURE AND EXTENSION CORD THEREFOR
Filed May 13, 1938
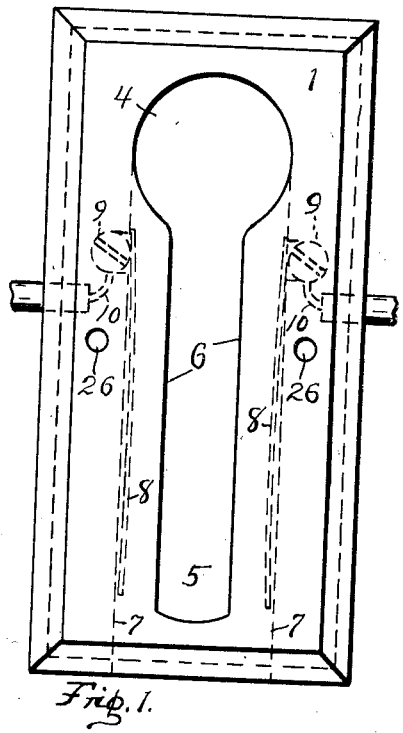
Fig. 1.
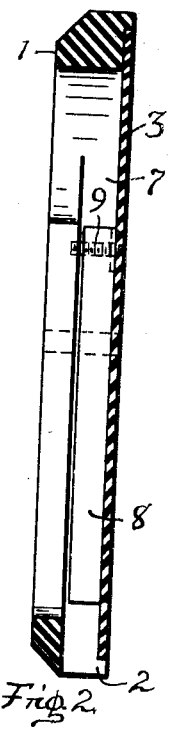
Fig. 2.
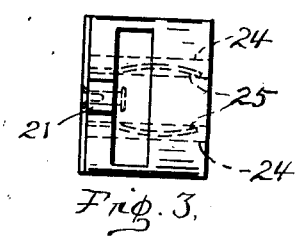
Fig. 3.
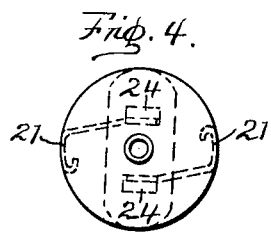
Fig. 4.
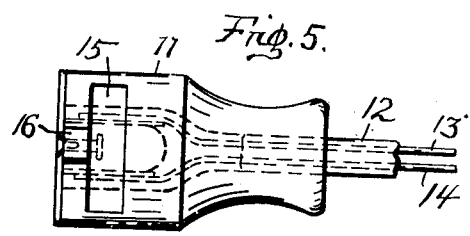
Fig. 5.
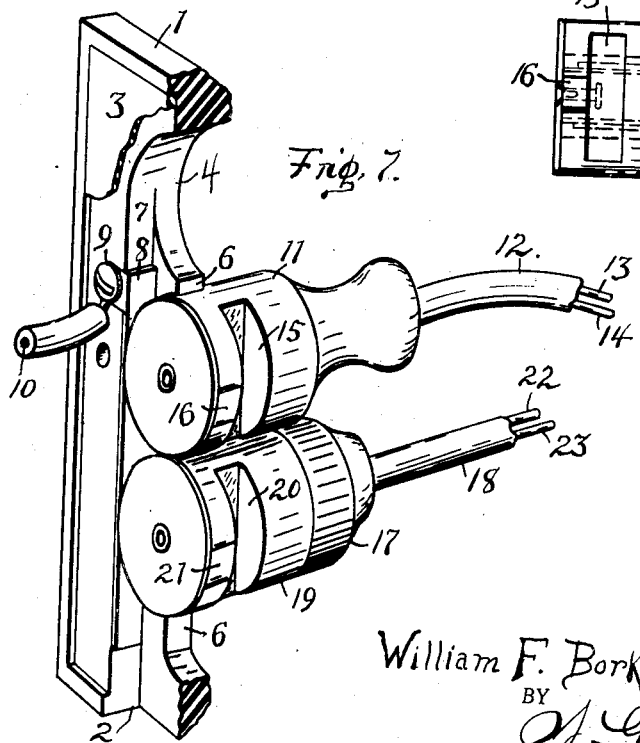
Fig. 7.
Fig. 6.
William F. Borkenstein INVENTOR.
BY
A. G. Burns ATTORNEY.

Patented Jan. 9, 1940

2,186,601

UNITED STATES PATENT OFFICE 2,186,601

ELECTRIC OUTLET FIXTURE AND EXTENSION CORD THEREFOR

William F. Borkenstein, Fort Wayne, Ind.

Application May 13, 1938, Serial No. 207,832

1 Claim. (Cl. 173—330)

This invention relates to improvements in electric outlet fixtures and extension cord plug therefor, and an object hereof is to provide an appliance so constituted as to facilitate establishing electrical connections between the conductors in an extension cord and the conductors related with a source of electric energy.

Another object of the invention is to provide a wall fixture having feed terminals that are connected with a source of electrical energy so constituted as to shelter its contacting members, and to provide also a connecting plug for an extension cord so formed as to permit quick application and removal of the plug with respect to its operative relation with said fixture, the purpose being to enable the operator to form an electric connection between feed wires and the wires of an extension cord readily without attendant groping.

Other objects and advantages of the invention appear in the following description.

The illustrative embodiment of the invention is shown in the accompanying drawing, in which:

Fig. 1 is a front elevation of a wall fixture constituting a part of the invention;

Fig. 2 is a view showing a vertical section projected from Fig. 1;

Fig. 3 is a side elevation of an adapter, another part of the invention, for connection with said fixture;

Fig. 4 is an end elevation of the adapter;

Fig. 5 is a side view showing one form of the adapter for connection with said fixture;

Fig. 6 is an end elevation of the adapter shown in Fig. 5; and

Fig. 7 is a fragmentary perspective rear view of the wall fixture and adapters of several types in connection therewith.

The illustrative embodiment of the invention is constituted of a wall plate 1 having therein a chamber 2 that is closed in the rear of the plate by a back 3, the plate and the back being formed of insulating material. The front face of the plate 1 has an opening 4 therein preferably having the shape of a keyhole, viz:—the upper end of the hole is comparatively larger than the lower portion which constitutes a narrow continuation 5 of the enlarged portion. The chamber 2 is substantially as wide as the upper end of the opening 4 and extends downwardly in the plate through the bottom thereof to afford egress for such dust or transient foreign matter that may enter the chamber through the keyhole opening, thus to obviate accumulation of such matter within the chamber.

That portion of the front face of the plate having the elongated continuation 5 therein affords opposing guides 6 spaced apart, and also the sides of the chamber 2 within the plate afford parallel walls 7 that are spaced suitably distant from the corresponding inner edges of the guide 6. Upon each side wall 7 is disposed an elongated electrical contactor 8 secured preferably by a binding screw 9 adapted for attachment of an electric conductor 10 whereby electrical connection is established between the corresponding conductor and contactor.

A contact-forming plug 11 is provided which is adapted to be mounted in connection with the wall fixture by means of which an electric extension cord 12 is secured so that the circuit wires 13 and 14 are placed in connection with the contactors 8 when the plug is operatively connected with the wall fixture. The plug 11 has made in its opposite sides slots 15 in which the corresponding guides 6 are received when the plug is introduced into the large end of the opening 4 and moved downwardly between the contactors 8 thus securing the plug in operating position relative to the wall fixture. Thus, the plug 11 has upon one end thereof opposite peripheral exposed contactors 16 by which is established electrical connections with the corresponding contactors 8 in the wall fixture when said plug is in operative position.

In some instances, it is desirable to form electrical connections with the wall fixture by use of an ordinary connecting plug 17 provided with an extension cord 18 such as is in common practice. In such event an adapter 19 is provided that is similar in form to the plug 11, there being provided in its sides slots 20 for the reception of the corresponding guides 6 when the adapter is placed in connection with the wall fixture in the same manner as in the former instance, said adapter having contactors 21 by which is established electrical connection with the contactors 8 in the wall fixture with circuit wires 22—23 in the extension cord 18, through the medium of the ordinary plug 17. The adapter has formed therein sockets 24 for the reception of the extending prongs (not shown) with which the ordinary connecting plug 17 is provided so that contacts are formed with the electrical members 25 that are located in said sockets and have connection with the conductors 21 respectively. Thus, is permitted disconnection of the extension cord 18 from the adapter 19 without removal of the adapter from the wall fixture, which is advantageous especially when frequent connections or disconnections between the extension cord and the wall fixture are desired.

Operation

In using the invention the conductors 10 that lead from a suitable source of electric energy (not shown) are connected with the contactors 8 by the screws 9, and the plate 1 is secured to the wall of a building or other suitable mount, there being provided bolt holes 26 extending through the plate and back for the reception of screws (not shown) that are applied to hold the wall fixture in a position so that the keyhole opening is exposed and accessible. The circuit wires 13 and 14 are connected in the usual manner to whatever electrical device (not shown) that is to be energized. The plug 11 is then inserted through the enlarged end of the opening 4 and manipulated so as to be moved downwardly into the elongated continuation 5 between the guides 6 which extend into the slots 15 in the plug thus preventing turning of the plug in the fixture and insuring engagement of the contactors 8 and 16 thus completing the electrical circuit. The plug is readily removed merely by elevating the plug into the enlarged portion of the opening and withdrawing it. When the adapter is used, it is placed in connection with the wall fixture, in the same manner as the plug previously described, after which the ordinary connecting plug 17, which has connected therewith an extension cord, is attached or removed from the adapter as in the customary practice.

As indicated in the drawing the elongated continuation may be of such length as to permit assemblage therein of several adapters or plugs as occasion may require.

A feature of the invention is that the contactors 8 are located back of the guides 6 where they are sheltered from exposure so as to prevent accidental shock from physical contact therewith, and a further feature is that the connecting plug and the adapter are provided with guide-receiving slots so that the plug or adapter when inserted in operative position in the fixture there will be established proper electrical connections between the contactors on the plug or adapter with the contactors in the fixture.

Variations from the particular construction above disclosed may readily be made by exercise of engineering skill without departure from the spirit or scope of the invention, and the following claim is intended to be inclusive of such variations.

What I claim is:

An electrical outlet fixture and connection plug therefor, said fixture consisting of a wall plate having a chamber that is open at the bottom thereof, the front wall of said plate having a plug-receiving aperture therein communicating with said chamber, the upper end portion of said aperture being enlarged and the lower portion thereof being comparatively narrower and terminating at a point above the bottom of said plate, those portions of the front of said plate adjacent the narrow portion of the aperture constituting plug-supporting guides, the side walls of said chamber adjacent said guides having thereon contactors oppositely disposed, said connection plug having side slots for the reception of said guides and provided with other contactors on its periphery oppositely disposed and engageable with the corresponding contactors in said fixture when the plug is in place.

WILLIAM F. BORKENSTEIN.